May 26, 1936.  E. A. STALKER  2,041,789
AIRCRAFT
Filed Nov. 27, 1933   6 Sheets-Sheet 1

INVENTOR
Edward A. Stalker

May 26, 1936.  E. A. STALKER  2,041,789

AIRCRAFT

Filed Nov. 27, 1933   6 Sheets-Sheet 2

INVENTOR
Edward A. Stalker

May 26, 1936.　　　　　E. A. STALKER　　　　　2,041,789
AIRCRAFT
Filed Nov. 27, 1933　　　　6 Sheets-Sheet 3

INVENTOR
Edward A. Stalker

May 26, 1936.  E. A. STALKER  2,041,789
AIRCRAFT
Filed Nov. 27, 1933  6 Sheets-Sheet 4
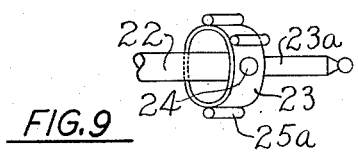
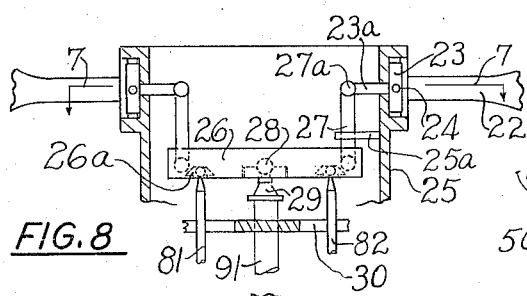
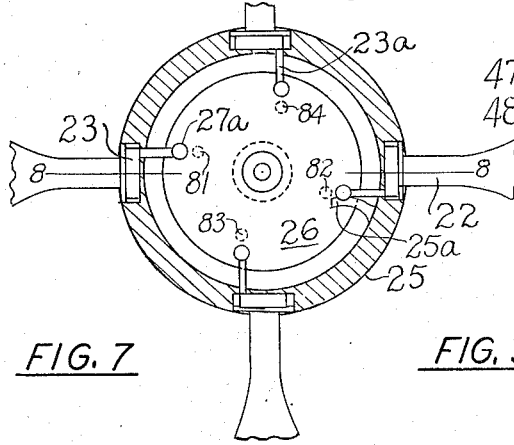
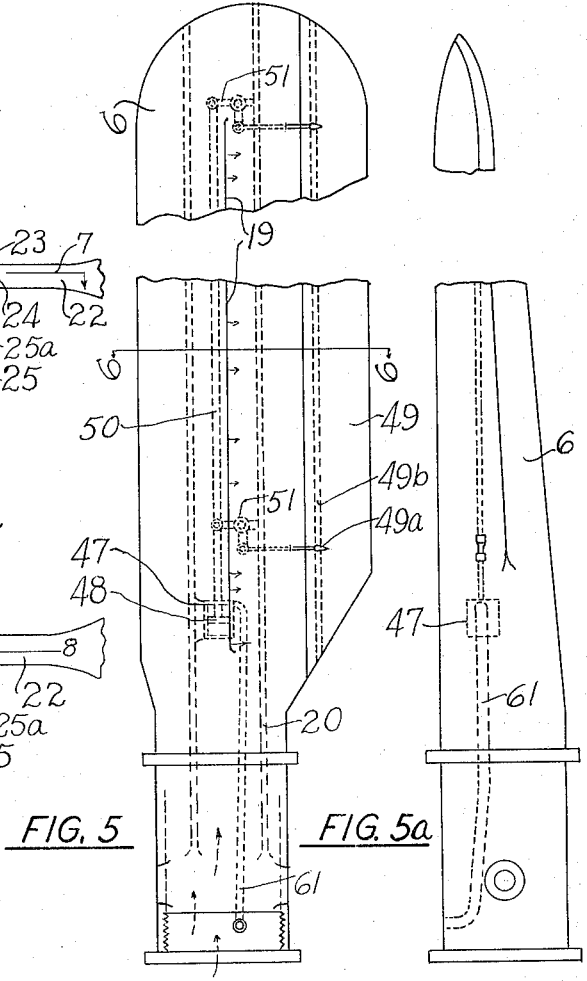
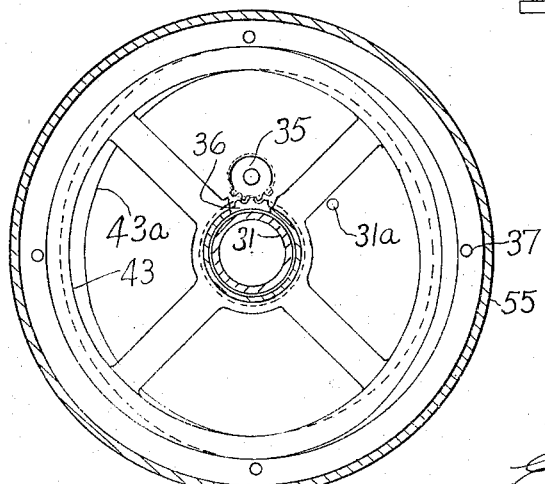
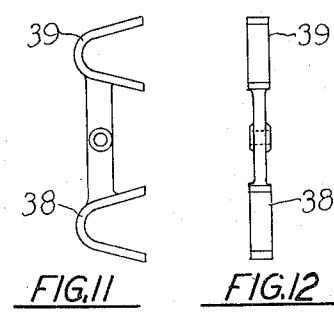
INVENTOR
Edward A. Stalker May 26, 1936.  E. A. STALKER  2,041,789
AIRCRAFT
Filed Nov. 27, 1933   6 Sheets-Sheet 5
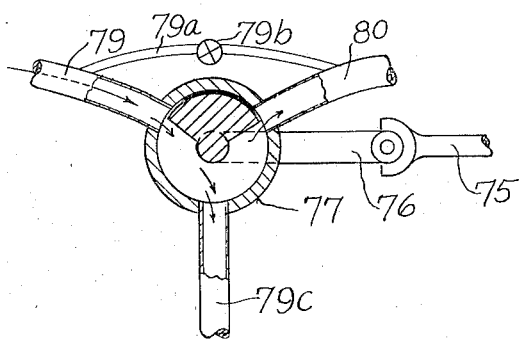
FIG.17
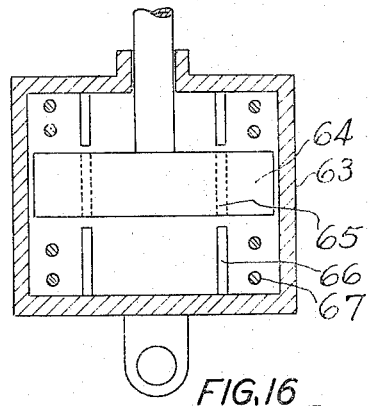
FIG.16
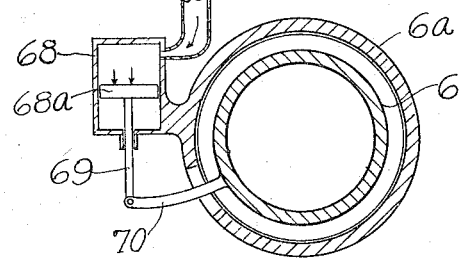
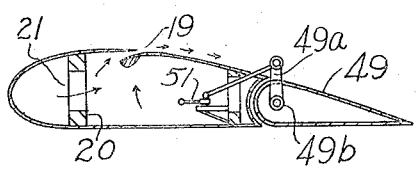
FIG. 6
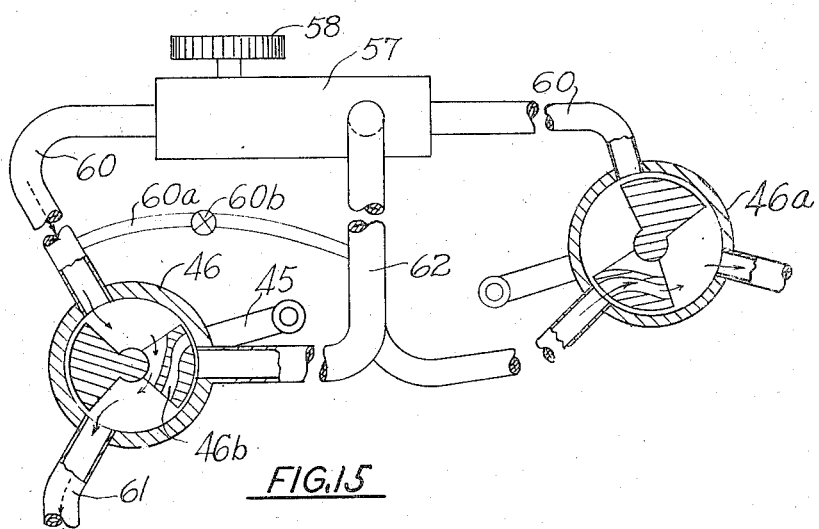
FIG.15
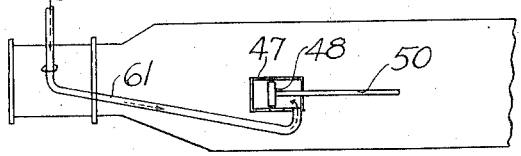
INVENTOR
Edward A. Stalker

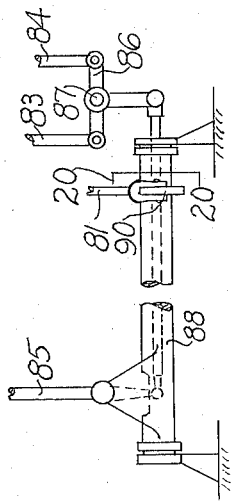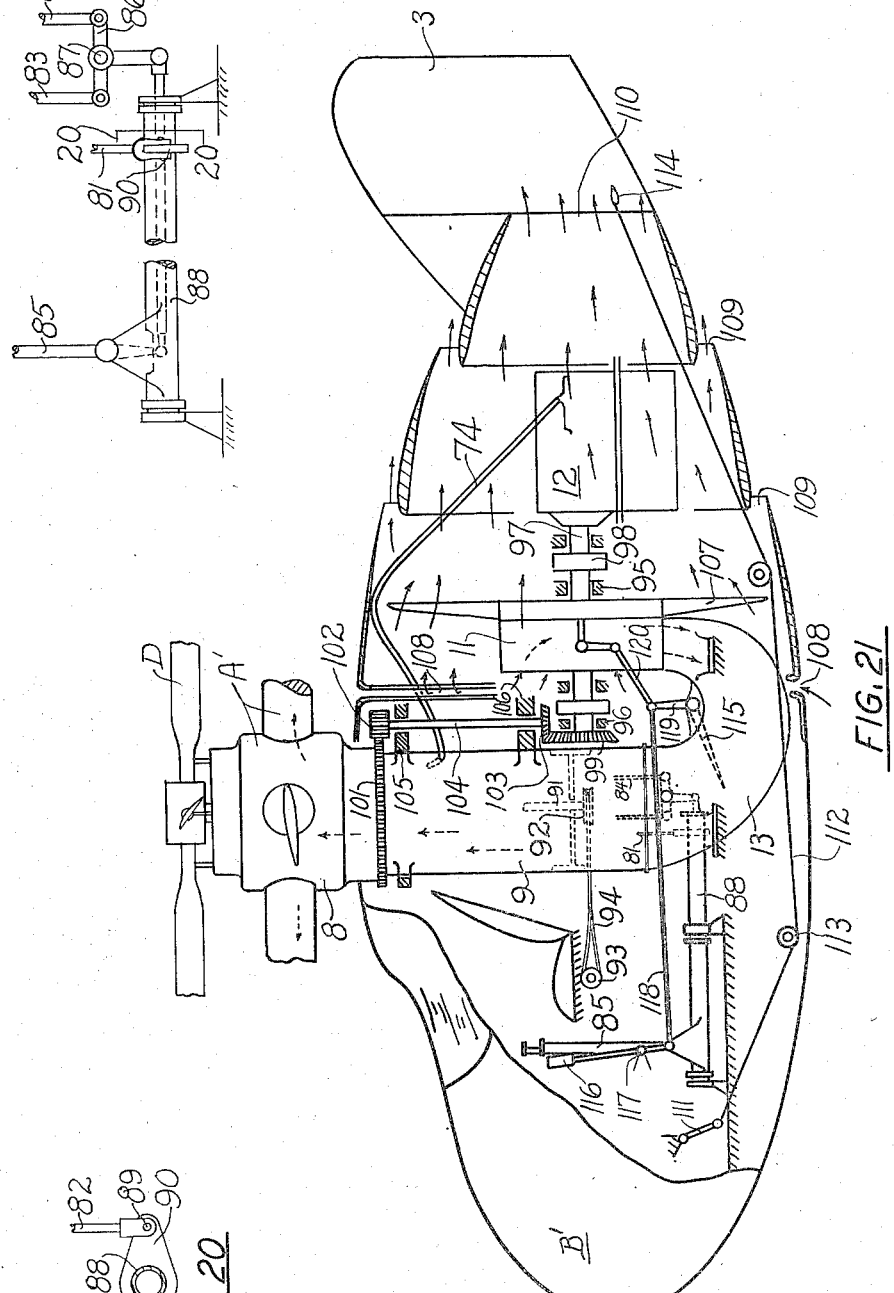

Patented May 26, 1936

2,041,789

UNITED STATES PATENT OFFICE 2,041,789

AIRCRAFT

Edward A. Stalker, Ann Arbor, Mich.

Application November 27, 1933, Serial No. 699,885

24 Claims. (Cl. 244—19)

My invention relates to aircraft sustained directly by rotatable wings and particularly to a means of propulsion incorporating the use of boundary layer energization and to means of controlling the aircraft as a function of the rotating wings. It is a continuation in part of my previous applications filed February 17, 1933, Serial No. 657,174, and October 25, 1933, Serial No. 695,149.

The first object is to rotate the lifting wings about an axis by means of a sheet of fluid discharged out the wing surface toward the trailing edge.

The second object is to control the aircraft about all three body axes, particularly as a function of the operation of the wings.

The third object is to provide a means of automatic balancing of upsetting moments on the wings as a function of parts rotatable at a greater speed than the wings.

A fourth object is to provide a means of obtaining a very slow rate of descent of an aircraft or body deriving sustentation from rotating wings.

A fifth object is to provide a change of the pitch of the lifting wings as a function of the status of the engine operation.

A sixth object is to provide means of changing the angles of attack hydraulically.

Another object is to provide an aircraft that will be an organic whole as regards all the functions necessary for flight, including slow landings and maneuvering on the ground.

Other objects will appear from the accompanying description and drawings.

Some explanation of the theories underlying the objectives and their accomplishment are given before describing the construction of the invention.

Attention is first called to the fact that the failure of inventors to develop a direct lift aircraft has in part resulted from their inability to provide a satisfactory drive to rotate the wing system. In order to insure a safe descent with a helicopter for instance the diameter of the airscrew must be very large, so large that without power applied to the airscrew shaft but with the airscrew autorotating, the rate of descent must be a safe value. This condition is necessary because of the ever present imminence of power plant failure. Then the airscrew diameter is so large that the engine cannot rotate it at engine speed. On the contrary a gear reduction of the order of at least 1 to 10 is necessary. The figures on a machine of ordinary proportions are instructive. Consider a typical machine of 300 horsepower forty foot diameter airscrew and having a distance from the center of gravity to the tail post of 15 feet. The torque of the engine at 1800 R. P. M. is 490 ft. lb. but due to a gear reduction of 10 to 1 the torque to rotate the airscrew is 4900 ft. lb. It has been proposed to counteract this torque, which would spin the fuselage or body oppositely to the wings, by an airscrew at the tail post rotating in the longitudinal plane of symmetry. If the center of gravity distance is 15 ft. the force at the tail post must be 327 lb. To produce this force would require about 60 horsepower (all of which energy is lost) and a propeller of about six feet in diameter, a figure too large to entertain.

To avoid the disadvantages of a gear drive the proposal has been made by many to rotate the wings by the momentum reaction of a fluid jet discharged at high speed from the tips of the wings. The tips are selected for the orifice because the efficiency of jet propulsion depends on and is the larger the greater the ratio of tip speed to jet speed. If these speeds are equal the discharged jet has no velocity relative to the ground and hence all its energy has been used by the wing and the efficiency is 100 per cent neglecting internal nozzle losses. To obtain sufficient reaction by the discharge from the tip the velocity of discharge must be high and hence the fluid which is always a gas must be highly compressed. Either positive compressors or blowers are proposed or some explosive is used which generates a very high pressure and by the use of an orifice a high velocity jet is discharged. Either these schemes have been proposed only or they have not succeeded. I mention them as a necessary background, but I nevertheless proceed in a diametrically opposite direction with my invention.

I proceed on the theory that it is more effective to reduce the resistance than to overcome it especially if, as I shall show, the reduction in resistance is obtained almost entirely as a gratuity. As a concurrent donation the difficulty of the counter torque from the wings is suppressed.

The energization of the boundary layer forms the basis of the method of propulsion. This layer is the small stratum of fluid adjacent the surface of a body wetted by it. The characteristic that sets this layer off from the rest of the fluid is its low velocity compared to the fluid further from the body. The small speed also indicates a deficiency of kinetic energy which has been lost as heat due to the rubbing of the fluid on the body.

When the body is of such a shape that there are low pressure regions well forward on the body as is the case for a streamline form, the boundary layer has serious consequences; for on such a form there is near the maximum cross section a low pressure region which is able to reverse the flow in the boundary layer because the particles of fluid no longer have sufficient momentum to keep them moving rearward. The forward flow in the layer clashes with the rearward flow with resulting turbulence and failure of the main flow to follow the body contour. The wake of the body is then at a low pressure which draws back on the body—in other words a drag. The boundary layer is always present. In a wing it becomes huge on the upper surface at some large angle and precludes any further increase of lift.

The boundary layer may be suppressed by the simple expedient of adding to it at appropriate points a small amount of energy, very small in proportion to the energy which must be used to overcome the drag caused by the unsuppressed effects; or small in comparison to the lift gained. A slot in the body surface formed to discharge rearward along and over a substantial surface is one method of adding energy. These slots should be narrow and they are most effective near the maximum cross section of the body. An opening normal to the surface or inclined, subjected to a suction to withdraw the boundary layer before its direction reverses will also accomplish the desired result. In either case energy is added to the boundary layer, from which the general term of boundary layer energization is derived.

Suction is beneficial chiefly in the case of improving the lift where the drag is not important as in the landing of an aircraft, for then the suction adds to the lift. Where the drag is important it is always already a small quantity and the addition of the suction force if it acts with a rearward component, even though small, may nevertheless still be an appreciable percentage of the small drag. On the contrary the use of blowing avails the aircraft of the jet reaction and as a gratuity the energization of the boundary layer which greatly reduces the drag of the body. In the case of a wing the lift is also increased by the blowing.

I propel the wings not with a jet blown from a nozzle of small cross section and formed by positive compressors or blowers creating a high pressure to get sufficient fluid through the small orifices, but with a sheet of fluid discharged through a slot extending over a major portion of the radius of the rotatable wing. By making the sheet of fluid serve the dual purpose of reducing the drag and providing a rotative thrust I am able to attain a lift adequate to sustain the aircraft and propel it forward when the axis of the rotating wings is inclined forward to give a forward component of force.

I am aware that the proposal has been made that high pressure jets be blown out the upper surface of a horizontally rotatable propeller but I am not aware of any in which the openings were properly located or extended over a sufficient length of radius to affect the boundary layer in a significant manner; nor am I aware of any jets created at low pressures or by means not employing heated jets to obtain the requisite velocity for the ordinary jet propulsion. The use of positive blowers and heating means are indicative of reliance on high velocity reactive drives only.

I employ pressures of such a magnitude that they may be created by ordinary blowers which rely on accelerating the air or gas rather than by changing its volume within the pump before releasing the charge. The pressures also are not dependent on subsequent heating of the charge.

One of the objects of this invention is to combine a number of unique solutions to the direct lift aircraft problem so that the whole is an organic one, all the mechanisms cooperating to provide a stable and controllable flying machine. If the aircraft is an organic whole in flight, it must pass the following tests. The machine may be considered as suspended at a point which is the juncture of all three space axes. An aircraft has freedom to move along these axes in any manner and is also free to turn about them in any manner. That is, the aircraft has six degrees of freedom—three translations and three rotations are possible. Any of these motions may be of a general type, that is, not necessarily uniform but accelerated, and components of all six motions may occur simultaneously.

If the aircraft is an organic whole as regards its stability, there must be restoring moments arise when the aircraft is disturbed. Consider, then, to be explicit, a helicopter and let it be disturbed by a moment tending to tip up the front edge of the disk area swept by the rotating wings. The aircraft immediately tilts laterally due to gyroscopic action. If the aircraft is an organic whole as regards stability the aircraft must create moments tending to oppose both the initial and the gyroscopic moments and restore the aircraft to its original position. There must also be stability about the vertical axis. This is usually called directional stability or stability in yaw.

If the aircraft is an organic whole as regards control, it must be possible to direct the aircraft in any direction which calls for the ability to execute a rotation about any axis in any sense. In the case of the helicopter, for instance, it must be possible to yaw, pitch and roll the aircraft while stationary or in vertical descent—as well as during motion in any other direction. It will then be possible to maintain balance about all three axes.

Finally, if the aircraft is an organic whole as regards both balance and control, it must be possible to execute a maneuver about and along one axis without losing balance about another axis. Consider again the case of the helicopter and move the control stick so that the airplane pitches up at the nose. The gyroscopic moment at right angles to the pitch must be balanced. This balance must exist whether the aircraft is stationary or moving horizontally or vertically. Evidently to achieve both balance and control as described the aircraft must be highly organized.

This invention presents a direct lift aircraft as an organic whole as regards stability, balance and control.

Referring now more particularly to the drawings I will describe the means by which I accomplish the objects of this invention:

In Figure 1 I show a side view of the machine;

Figure 5 is a top plan of one of the main wings;

Figure 5a is a rear elevation of one of the main wings;

Figure 6 is a cross section along the line 6—6 of Figure 5;

Figure 7 is a view from above of the control airscrew hub in section on line 7—7 of Figure 8 showing the hub ends of the blades and the pitch changing mechanism;

Figure 8 is a fragmentary vertical part section through the hub of the control airscrew and the supporting fulcrum along line 8—8 of Figure 7;

Figure 9 is a perspective view of the blade root and its ring for rotating the blades;

Figure 10 is a horizontal fragmentary cross section through the hub on the line 10—10 of Figure 4 to show the disks and the gear drive between the airscrew and the wings;

Figure 11 is a side elevation of a slipper;

Figure 12 is a front view of the slipper;

Figure 15 depicts diagrammatically the arrangement of the hydraulic system for altering the angles of attack of the wings;

Figure 16 is a vertical cross section of one of the wing shock absorbers;

Figure 17 is a vertical section through the sleeve of the wing along the line 17—17 in Figure 3a, and shown in relation to the valve for controlling the pitch of the main wings;

Figure 19 is a fragmentary side view of the pilot's control shown removed from the aircraft;

Figure 20 is a section along the line 20—20 of Figure 19; and

Figure 21 is a side view of the fuselage partly in section to show particularly the relation of shaft, blower, propeller, and control mechanism.

Figure 1:
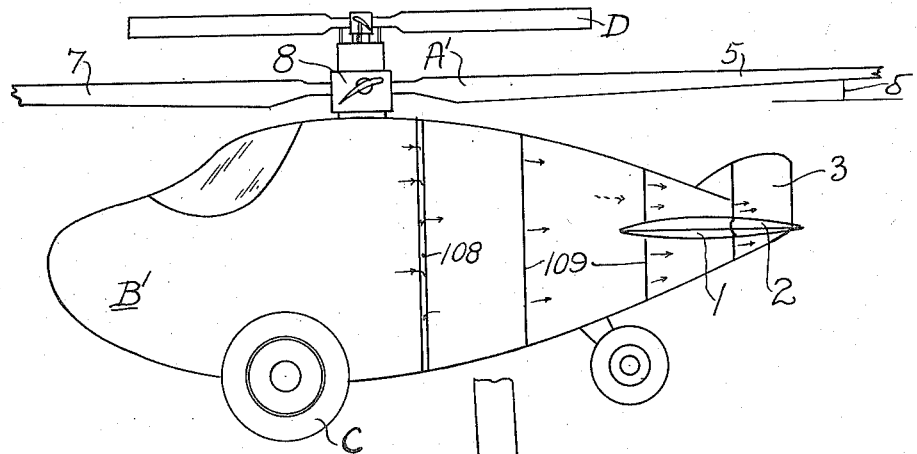

In Figure 1 the airscrew or, as I shall call it, the wing system is A', the fuselage or body is B'. The landing gear is C. The stabilizer and elevator are indicated by the numerals 1 and 2 respectively, while the rudder is 3.

Figure 2:
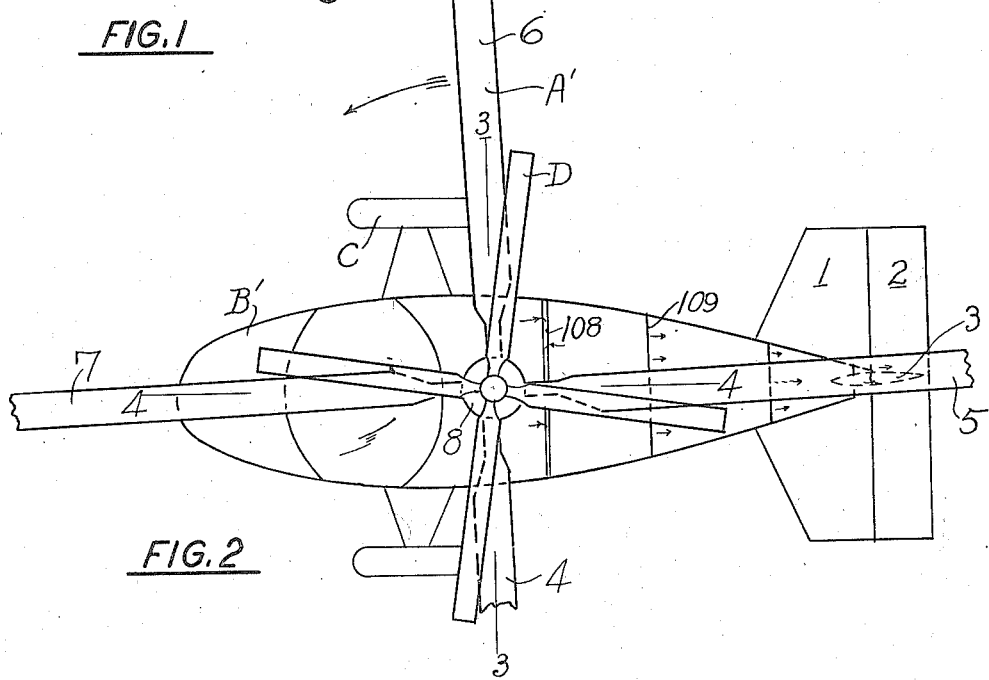
Figure 2 is a plan view of the aircraft.
Figure 3:
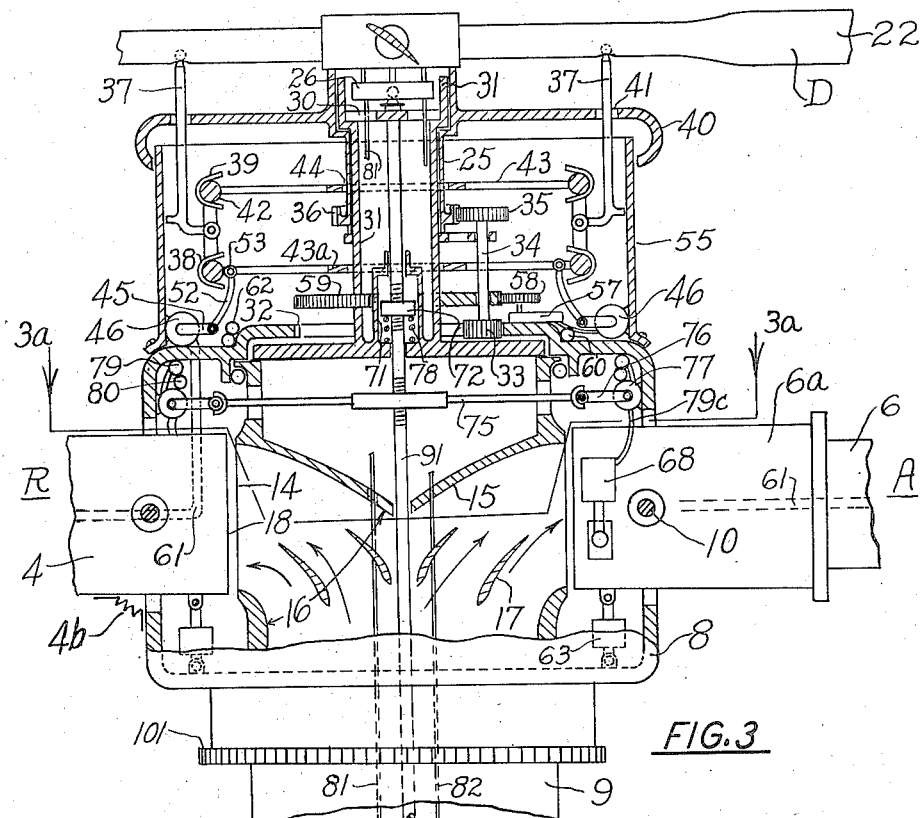
Figure 3 is a vertical section through the hub and stationary supporting shaft on the line 3—3 of Figure 2.

Viewing Figures 1, 2, and 3 together it will be noted that the wings 4, 5, 6, and 7 are carried by the hub 8 and that it is mounted rotatably on the stationary shaft 9 by ball bearings. The structure to support and hold the shaft 9 stationary in the body B' will be readily supplied by one skilled in the art and forms no part of this invention. The wings are hollow and hinged on the pin 10 for vertical oscillation.

Fluid, preferably air, is blown up the inside of the shaft 9 by a blower 11 shown in Figure 21 and driven by the engine 12. A light conduit 13 conducts the air from the blower to the shaft 9 and the shaft openings 14. The flow proceeds at a low velocity up the shaft 9 because of the large cross section which keeps low the friction losses with the walls. At the level of the wings, Figure 3, the curved partition 15 and the vanes 17 encircling the shaft deflect the flow into the open ends 18 of the wings. Particular heed should be paid to the bell mouth 16 similar to the entrance to a Venturi tube, for it fills this role. The fabric 4b should be used at joints to prevent leakage.

A large volume of air is needed within the wing because of the low pressure and the long discharge slot 19 shown in the wing plan of Figure 5. It is also desirable to keep the cross section of the root sections of the wings small to keep their resistance low because they compensate for their drag with very little lift. I harmonize these contradictory requirements by making the cross section as small as consistent with strength and practicability and then fashioning the wing interiorly so that the cross section gradually increases. In this manner I obtain a Venturi tube extending from the bell mouth in the shaft to the tip of the wing. As is well known this formation of a tube will pass as much fluid through it as though there were no cross section of narrow form. To accomplish such a purpose as I outline an ordinary Venturi tube could have a diverging segment with an included angle of only 7 or 8 degrees. I am enabled to widen out the interior cross section inside the wings more rapidly because of the suction above the wing which acts through the slot 19 and aids the flow out the slot.

The form of the slot is shown in Figure 6 which is a peripheral cross section of the wing. The slot is formed with a well rounded entrance and its walls direct the flow toward the trailing edge. Within the wing the spar 20 extends from the root to the tip and forms a part of the structure. The vertical members 21 of the spar are spaced apart so that the flow may progress chordwise in the wing as well as spanwise. See also Figure 5.

Figure 4:
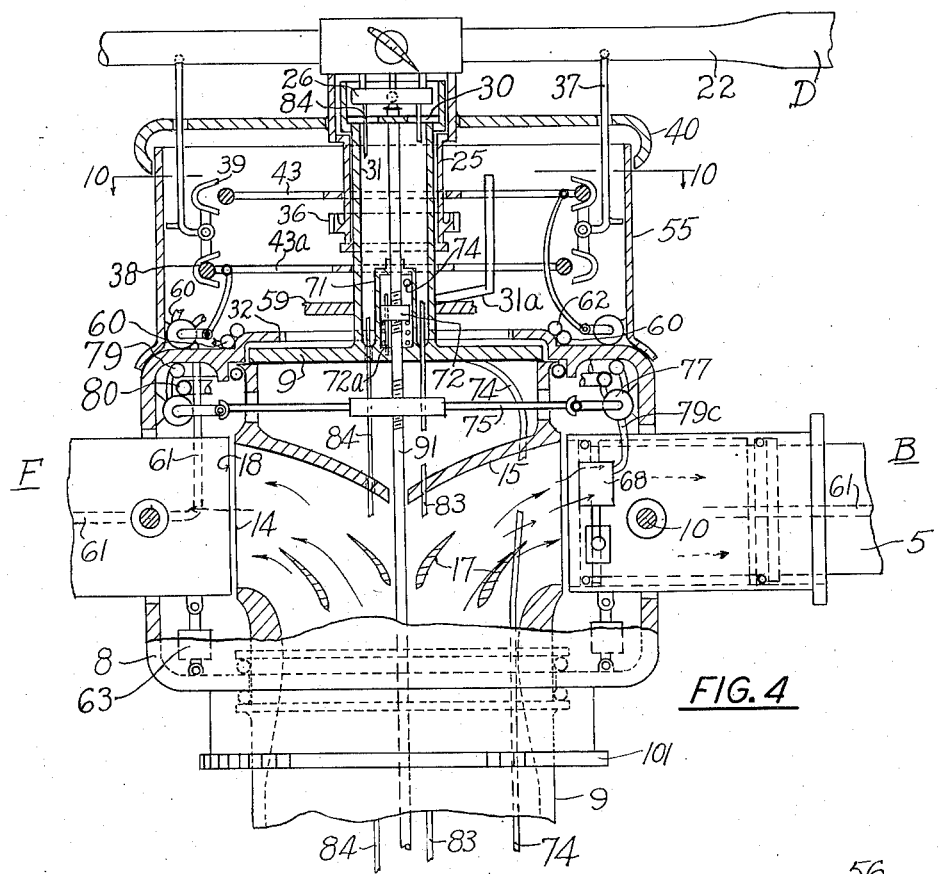
Figure 4 is a longitudinal vertical section of the hub and stationary shaft along the line 4—4 of Figure 2.

The wing system has an inherent unbalance laterally because the advancing wing has a higher velocity relative to the wind than the retreating wing. It is desirable to annihilate this unbalance and it is particularly desirable to accomplish this automatically for all ratios of peripheral to forward speed. It is this ratio that determines the degrees of lift dissymmetry. Hence the automatic means must be sensitive to changes of this ratio as well as the difference between the wind speed for advancing and retreating wings. The problem posed is solved by the placement of another airscrew horizontally rotatable about the axis of the main shaft 9. In Figures 3 and 4 the airscrew D has blades 22 which I designate as control blades to distinguish them from the main lifting wings. Other features are illustrated in Figures 7, 8 and 9. In these figures it will be observed that the blades are hinged within a ring 23 for free vertical oscillation about the pivot 24. The wing is mounted in the hub 25 on rollers 25a so that it may be rotated to change the pitch of the blade. Arms 23a extending inward from the rings 23 are attached to a disk block 26, which I call a lever, by ball and socket joints 27a and links 27. The lower ends of 27 are also balls socketed in the lever to produce universal connections. In turn the lever is mounted on the ball 28 so that it may wabble or tilt in any direction. The ball is formed on a shaft 29 supported by a cross bar 30 of the housing 31 resting stationary on the end of shaft 9.

The control blades 22 are revolved by the main wings through proper gear connections. See Figures 3, 4 and 10. The hub 8 has the internal gear 32 meshing with the gear 33 carried on shaft 34, which is supported from the housing 31. The shaft 34 therefore does not turn about the housing 31. At the upper end of the shaft there is the gear 35 which engages the gear 36 formed as a part of the continuation of the control blade hub 25. As depicted the control blades revolve in the opposite direction to the wings and the oscillation of the control blades are to control the lift on the main wings so that they and the aircraft are maintained in equilibrium.

Due to a horizontal translation of the aircraft the advancing control blade will experience more lift than the retreating. Only when in an approximately fore and aft position will the lifts of the two be about equal. The control blades by the character of their oscillations are to control the lift of the main wings. I have shown how this may be done in my application Serial No. 695,149 for the case where each control blade always bears the same relation to one of the wings. Where the control blades rotate at a different rate than the main wings the problem is more difficult to solve. It consists in assigning to a wing a definite lift determined by the character of the oscillation of a control blade when it is in a predetermined locality; or when a group of control blades are in a predetermined locality. For instance, to attain a balance of transverse moments on the wing system the lift of the retreating wing should be increased in proper proportion. The need and magnitude of this increase bears a functional relation to one or several of the control blades because they are also subjected to varying relative winds and are coordinated to the main wings through the gearing 33, 35 and 36. I prefer to establish the relationship between blades and wings on the same side of a vertical plane through the hub center. Thus I prefer that the retreating wing when in the laterally extended position be influenced by the control blade in the near vicinity of this position. As successive control blades pass the wing each brings its governing influence.

In Figure 3 note that vertical rods 37 extend downward from the control blades 22 to which they are universally articulated. At the lower ends of the rods are slippers 38 and 39 joined integrally. They are carried around by the rotation of the airscrew D and the hub cover 40 due to the pressure of the hole wall at 41. The hub cover 40 is integral with the hub 25. Each slipper slides on the curved guide 42 which is the rim of a disk 43 shown also in Figures 4 and 10. The disks have a hole 44 at their center and are free to move vertically along the extension of the hub 25. It will now be readily apparent that as the control blade oscillates in the lateral position it will move the rim of the disks 43 and 43a vertically. A suitable stop 31a seen in Figure 4 restrains the disks from rotation about 31. Then the motion of the disk may be used to govern the variation of lift of the main wings. For instance, the advancing blade in Figure 3 due to its lift rises against a centrifugal force moment and the extent of the rise is a measure of the ratio between the speed of rotation of the wings and the forward speed of the aircraft. Corresponding to this speed ratio the retreating wing needs a certain augmentation of the lift which may be obtained by changing the angle of attack of the wing. Due to the greater speed of the blades there will be times when no blade is directly over the wing. Under this condition there will, however, always be a blade just approaching and just leaving the instantaneous wing position and it is under their combined influence that the wing will be governed for they will jointly determine the extent of a rise or fall of a point on the rim of the disks. The wing is always related to the disk.

The movement of the disk is contributed to the valve arm 45 of the valve 46 and fluid under pressure flows to the cylinder 47; and so piston 48 shown in Figures 5 and 15, depresses the flap 49 through conventional rods 50 and bell cranks 51. Thus the angle of attack of the wing is changed. This will be discussed further later.

The valve arm 45 is operated by a link 52 hinged at 53 to the disk 43a. Ideally the point 53 should be at the center of the rim cross section because then a movement of the rim diametrically opposite to 53 would not move the rim at 53 vertically, and the retreating wing would be influenced only by the control blade near 53. Practically the small offset of 53 from the rim center is not important but the offset should be kept as small as possible consistent with cost of manufacture and expediency.

If more than three control blades are attached to a disk the rim of the disk would have to be deformable to permit the normal oscillations of the blades because three points of support will fix any body definitely in space; and the vertical position of the blades will all be different at any instant. Hence I do not attach more than three control blades to one disk; and this is the reason for showing two disks in Figure 3. I arrange the mechanism so that three control blades always control three wings; but from instant to instant there is a permutation of the blades in control of a given wing. This is possible because there are times when the slippers 38 and 39 are not both on a rim. The arrangement providing this is shown in Figure 4. The section is at right angles to the section in Figure 3 and shows the front and back blades, F and B respectively.

The disks are not perfectly round as indicated in Figures 4 and 10 but have their longitudinal diameters somewhat shortened. Also as indicated, their centers are displaced relatively in the longitudinal plane of the aircraft with the result that the slippers in taking up the front and back positions disengage themselves from the rim, each from a different disk. Hence when the four control blades are in the positions shown in Figures 3 and 4 each disk is supported at three points only, the two lateral points and one either front or back. Hence each disk may tilt due to the action of any blade related to the disk without impressing any restraint on the other blades. Both disks may also move vertically.

The process of disengagement and engagement is facilitated by the form of the slippers. See Figures 11 and 12. The sides of the jaws taper to the back and permit a gradual transference of contact from one rim to the other.

Figure 13:
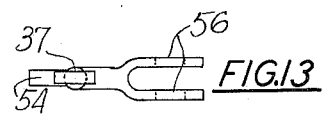
Figure 13 is an end view of the slipper rod.
Figure 14:
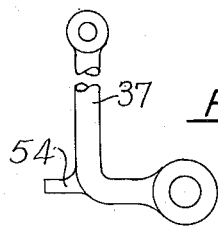
Figure 14 is a side elevation of the slipper rod.

The vertical rod, to which the slippers attach, is shown in detail in Figures 13 and 14. A projection 54 is provided to bear on the upper case 55 of the hub 8 so that the slippers are not thrown away from the disks by centrifugal force. The jaws 56 are to receive a slipper and the fit is to be such that there is practically no rotation of the slipper relative to the rod 37.

The control of the angle of attack of the wings is accomplished by hydraulic pressure motivating a flap of the wing as was mentioned earlier in this specification. The valves 46, pump 57, and cylinders 47 together with appropriate conduits constitute the hydraulic system. This system is shown diagrammatically in Figure 15 and the pump 57 and valves 46 are shown also in Figure 3 together with the conduit 61 leading from the valve into the wing. The valves and pump are borne on the hub and a conduit 60 runs peripherally about the hub inside to form a header through which each valve 46 is fed from the pump 58. A similar conduit 62 shown in Figures 3 and 4 serves to return the fluid to the pump. The pump 57 is actuated by the gear 58 in mesh with the gear 59 stationary on the shaft housing 31. Since the pump is supported on the hub 8 it is carried around gear 59 and the relative movement turns the pump shaft. The pump may be any type and I have shown a gear pump. The fluid, preferably oil, from the pump flows through a conduit 60 to the valve 46, Figure 15. The valve on the left is shown with the valve arm raised which will be the case of the retreating wing for then the control blade is advancing and rising. The fluid from the pump then passes through the valve into the conduit 61 leading to the cylinder 48. The pressure exerted on the piston moves it inward along with rod 50 so that by means of the bell cranks 51 the wing flap 49 is depressed thereby increasing the lift of the retreating wing. When the wing has moved into the advancing position, the control blade will be retreating and the lever 45 will be depressed, giving the position shown at 46a. The fluid flow will then be shut off from the cylinder 47 of the retreating wing and the fluid therein will have a free return passage to the pump by way of conduit 62 leading from the valve to the pump. When relieved of the fluid pressure the piston 48 moves radially outward under the action of the centrifugal force on the piston and the air load on the flap.

It may be noted from Figure 15 that with the lever in the down position the return flow is through the passage 46b in the valve and the inlet to the valve is closed. Under this condition excess oil is by-passed into the return tube 62 through the tube 60a and pop-valve 60b set to open at a certain pressure to be maintained in the conduit header 60.

The flap actuating mechanism is a conventional one regularly employed in aircraft. The bell crank 51 is connected by a rod with universal end joints to the flap horn 49a which is attached to the flap torque tube or spar 49b. See Figures 5 and 6.

Since one of the objects of the mechanism above described is to balance the aircraft against upsetting moments arising from the difference in relative velocity between advancing and retreating wings, this should be literally accomplished. In accomplishing this object I believe this machine is unique. I am, however, aware that mechanisms have been devised to increase the lift of the retreating wing and decrease the lift of the advancing wing; but such a procedure does not ensure balance. The forces engendered may actually upset the machine in the opposite direction. That is, it is one thing to induce a change of force in one direction but it is another thing to ensure that this change will not overrun its desired magnitude.

A common device to create changes of lift of the correct sign is an airfoil trailing behind the main wing and able to rotate the main wing, but there is no assurance that a change in angle of attack will just bring about balance and not overbalance.

The main wings must be independently adjustable to achieve balance at all ratios of peripheral speed of the wings to forward speed of the aircraft; and no invariable interconnection between wings is therefore permissible. This will be readily understood from the following cases. Let the forward speed be 100 miles per hour and let the peripheral speed be 200 miles per hour. The relative speed of the advancing wing is then 300 m. p. h. while that of the retreating wings is 100. The ratio between the wings is 3 to 1. Now let the forward speed change to 150 m. p. h. The advancing wing speed is then 350 but the relative speed of the retreating wing is 50; and the ratio of the two is 7 to 1. Hence it becomes clear that as the ratio of the speed of advance to peripheral speed changes the ratio between the effective velocities of the wings change. With a continuous change occurring between the relative speeds of opposite wings, balance cannot be achieved by invariable interconnections between the wings. What will suit one wing in respect of balance at one forward speed will not suit the other wing at other speeds.

Given the independently adjustable wings, there must also be a functional relation between the vanes and the lifts on the wings so that when the lifts on opposite wings come to equality there will be no further change in the angle of attack. That is, there must be what I call an arresting moment to stop the moment of the trailing vane (or control blade in my invention). I am not aware of any direct lift aircraft which does this. I am aware that it has been proposed that the center of gravity of a wing and its trailing vane be offset rearward from the spanwise axes about which the wing turns to alter the angle of attack. The weight of the wing and vane would then give a moment tending to increase the angle of attack of the wing and this moment might be an arresting moment opposed to the moment of the vane to bring the angular change to cessation. This scheme fails of its purpose for several reasons among which may be mentioned the following. The arresting moment from the offset center of gravity is negligible in comparison to the lift of the wings which must equal the weight of the aircraft. Also it is readily apparent that in a nose dive or a nose up vertical climb the pull of gravity will go through the spanwise axes so that there will be no weight moment about the spanwise axes and hence the arresting moment will disappear. This case, of course, may be extreme since the aircraft may never be dived sharply but it illustrates the point that for any intermediate attitude of the airplane between the vertical and the horizontal there will be a proportionate reduction in the arresting moment. But even for the horizontal attitude the arresting moment even if large enough would be inoperative. Assume that 20 lb. on the vane will balance the moment due to the offset center of gravity for an aircraft speed of 60 m. p. h. Then let the speed increase to 120 m. p. h. The vane load will increase about as the square of the velocity or approximately to 80 lb.; but the offset center of gravity exerts a constant arresting moment due to 20 lb. only, because the weight and center of gravity location are fixed by the structure. Thus there will be an unbalance of 60 lb. which will continue to rotate the wing until it reaches the structural checks or stops. Hence even if the aircraft were initially in balance at one horizontal speed, it could not remain in balance if the speed were changed. The difficulty, aside from the low value of the arresting moment arises because the moment due to the weight of the wings does not change with the change in relative wind on the wing but is a constant. There is no functional relation between the variable lift unbalance and the constant arresting moment.

In the machine of my invention the functional relationship is between the control blade and the wing, for the air force on the wing and on the vane arises from the airstream past them. The air force raises or lowers the control blade and the magnitude of the rise is conditioned by the centrifugal force acting on the control blade;

and the centrifugal force arises from the rate of rotation which is directly related to the main wings by the gearing. This centrifugal force is present at all speeds and for all attitudes of the airplane and increases with the amplitude of the oscillation of the blade and with the increase in rate of rotation of the main wings.

The problem of obtaining exact balance is solved in my invention because the control blades themselves are always in balance. An increase or decrease in lift moves the blades until the lift moment is balanced by the centrifugal force moment on the blades. Then since there is a functional relation between the control blades and the wings, when the blades are in balance the wings are likewise. (The idea that a blade may be balanced by opposing centrifugal force to the lift is well known in the art.)

The aircraft is also in balance under the action of gyroscopic moments. Consider Figure 3 which is a section seen from the rear so that the direction of rotation is indicated by A and R. Let the aircraft be tilted up at the front. As is well known, under this rotation the advancing wing will tend to dip. On the other hand the control blades have the opposite rotation and so the blade above the advancing wing rises under the gyroscopic action. Since the main wing is quite rigidly attached to the aircraft and the control blade is hinged, the blade will move rapidly up relative to the wing. An upward movement of the control blade increases the lift of the wing and so the upsetting gyroscopic moment is automatically suppressed. If the gyroscopic action is investigated for a roll it will be found likewise that the upsetting moment is suppressed. This also follows from the fact that the wing system is symmetrical about the vertical axis.

The wings are hinged at 10 and provided with a shock absorber to relieve shock loads and permit a lighter structure. However, the degree of oscillation is very small. The shock absorbers, seen in Figures 3, 3a, 4, and 16, consist of a cylinder 63 housing a close fitting piston 64 which contains through holes 65. The cylinder is fitted with an oil or other fluid and under the oscillation of the wing the piston moves vertically for a small distance, displacing oil through the holes 65. Further movement is restricted because the holes then encounter the pins 66 which fit into and slidably fill them. A heavy spring 67 also helps to bring the wings to a stop and absorb shock. It will thus be apparent that the wings are able to roll or pitch the aircraft.

Figure 3A:
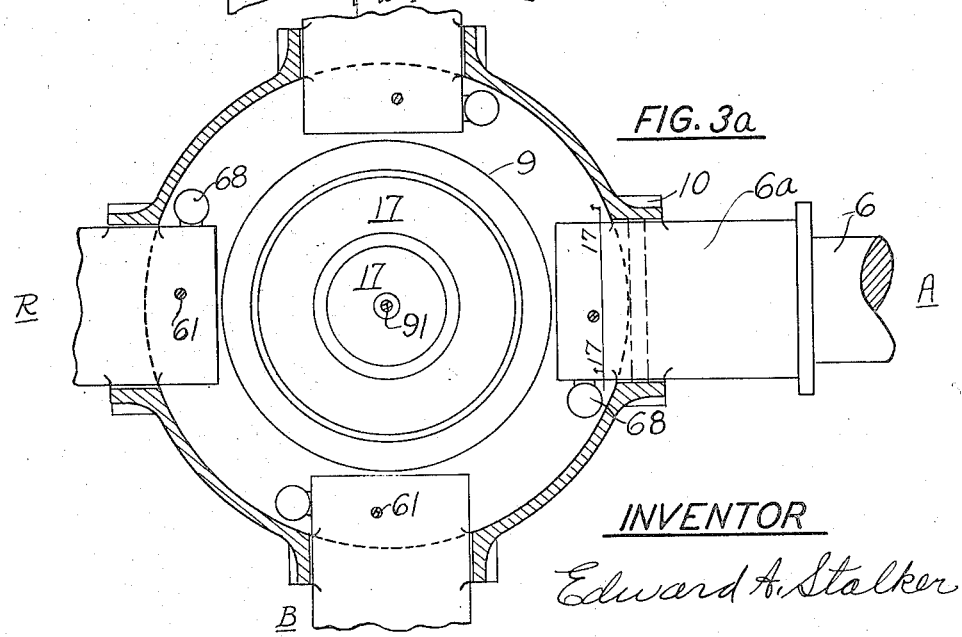
Figure 3a is a section through the hub at the level of the wings on the line 3a—3a of Figure 3.

The wings in addition to having the flap means of changing the angle of attack also have provision for their rotation bodily. As shown in Figures 3, 3a and 17 the wing 6, for example, fits into the sleeve 6a and is rotatable on ball bearings therein. Relative movement between the parts is accomplished by the cylinder 68 and piston 68a. The cylinder is rigidly attached to the sleeve and the piston rod 69 engages the arm 70 attached to the wing. Obviously a pressure on the top of the piston will rotate the wing. For clearness I will call this a pitch changing device; but both the flap and the wing rotations constitute changes in the angles of attack or pitch.

The operation of the pitch changing device is made to depend on the functioning of the engine. I do this because if the engine fails to supply enough power for sustentation, a landing must be made; and a good landing with a direct lift device is dependent on the continued rotation of the wing system. The angles of attack corresponding to best climb, and speed do not always correspond to the best angle for landing. Since motor failure occurs unannounced it is desirable to have the wings automatically assume the correct angles for autorotation of the wing system.

Figure 18:
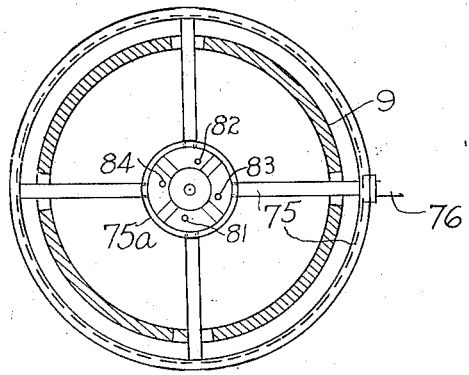
Figure 18 is a top plan of the spider used in operating the pitch changing valve, shown in relation to the supporting shaft and one valve arm.

The pitch changing device is operated by fluid from the pump 57 but the control of the flow to the piston is vested in the cylinder 71 and piston 72 subject to fluid pressure created by the engine, such as pressure tapped directly out of the engine cylinders or otherwise generated by the engine. See Figures 4 and 21. If as shown in these figures the tube 74 leads from the engine cylinders to the top of the piston, it is clear that the engine pressure will force the piston 72 down and with it the rod 73 and spider 75 shown in plan in Figure 18. This spider is stationary and carries a circularly grooved guide at the periphery into which a knob of a valve arm 76 slidably fits. The valve 77 is shown partly open in Figure 17. A movement of the piston 72 downward will open the valve inlet wider and close the valve exit further so that a greater pressure will be supplied to cylinder 68. This will increase the angle of attack as is proper when the engine is running. The increase in angle of attack is related to the engine pressure by the resistance of the spring 78 which will move in proportion to the pressure. If the engine fails the pressure will be lost and the spring will move the spider 75 upward and the lift on the wing will rotate it to a small angle of attack because the center pressure on the wing is well back of the center of rotation of the wing. The pump flow which enters the valve 77 by the tube 79 is diverted through the valve to the tube 80 and hence back to the pump. All the cylinders 67 are interconnected with the same supply tube 79 from the pump as shown best in Figure 4 so as to ensure equal rotation forces and angles for all wings. Such fluid pressure as generated by the engine or pump may be characterized as internal pressure in contrast to the wind pressure. To ensure against fluctuations in pressure when the valves open and close a by-pass 79a (Fig. 17) and pop valve 79b are inserted between 79 and 80. The pop valve is set to open at a certain pressure.

To control the aircraft it is only necessary to alter the angles of attack of the control blades slightly by means of the rods 81 and 82 for lateral control and 83 and 84 for longitudinal control. See Figures 3, 8, 19, and 20. By tilting the lever 26 the angles of attack of opposite blades are changed differentially and the blades take up different vertical positions which alter the lift of the wings. By this means the pilot may control the aircraft about any transverse axis. The rods 81 to 84 may be actuated by a conventional control shown in Figures 19, 20 and 21. The control stick is 85 and by moving it forward or backward the T-crank 86 is rocked about the pivot 87 and the oscillation communicates an up and down motion to the control rods 83 and 84. A lateral movement of the stick rolls the torque tube 88 so that the rods 81 and 82 are moved, since they are attached to the torque tube by the joint 89 and double arm 90. This is a well known type of control. If the linkage is traced it will be found that a forward motion of the stick will tilt the main wings down in front and a lateral movement of the stick will roll the aircraft. Hence the relation to this aircraft of the conventional control results in the usual relation between stick movement and aircraft movement.

The upper ends of rods 81 to 84 are socketed in the ring 26a slidably recessed in the lever 26.

The lug 25a ensures the turning of 26 with the blades.

Horizontal stability is ensured by the dihedral angle, Figure 1, as well as by the devices described. This angle functions just as it does in the fixed wing airplane except that in the rotating wings it promotes longitudinal stability as well as lateral.

In the wing system I have illustrated I have shown control blades of a radius of approximately 44 per cent of the radius of the wings. This is because the control blades are to serve another purpose besides control. I use them to obtain a very low landing speed. If the wings are rotated to fairly large negative angles, larger than are used for purely autorotative wing systems an appreciable amount of power may be generated by the wing. This part is well known. I use this power to turn the airscrew D made up of the control blades. I also retain a positive pitch of this airscrew so that upon rotation by the wings in descent the airscrew D pumps air downward. The result is a great increase in lift especially as the ground is approached. The air pumped downward in addition to giving a direct lift increases the air pressure below the wings and decreases it above them so that a greater upflow results through the wings than their rate of descent relative to the ground. Hence the wings absorb more energy and rotate the airscrew D even faster which again increases the pressure difference above and below the wings and again increases their energy absorption. These effects are accumulative but the process finally comes to balance because there are losses in the flow and due to the airscrew. The net result, however, is an increase of the lifting power many times over what a simple autorotating airscrew may attain. This advantage may be used to land the aircraft very slowly or to reduce the diameter of the wing system.

Although I have shown an airscrew D of diameter approximately 44 per cent of the diameter of the main wings, other proportions may be used. Also the airscrew D could be located elsewhere but I prefer the central position above the wings in the case of wings rotating about an upright axis because normally the inner one-third of the radius is little effective in producing lift or power and so the inner portions of the blades will not be affected adversely by the downflow from airscrew D.

I have described how the pitch of the wing system is dependent on the engine functioning. A change in pitch of the main wings would disturb the initial relation existing between the wings and the control blades. Hence when the wing pitch is changed the pitch of the blades should be changed also.

The pitch of the main wings is altered by the motion of the piston 72 and I have arranged that this same motion alters the pitch of the control blades. The extension 91 of the fulcrum shaft 29 passes downwardly through the piston 72 and the hub of the spider 75. The rod 91 is threaded through each of these members so that a tight fitting joint is provided. The shaft 91 is vertically slidable in the cross bar 30 so that a movement of the piston 72 will raise or lower the lever 26. From the description already given of the operation of 26 it will be realized that such a movement will alter the pitch of all the control blades.

The threads on the rod 91 also serve the purpose of manual trim. By rotating the rod 91 the lever 26 may be raised relative to the piston 72 and spider 75 which maintain their mutual relationship. The control of the rod 91 is operable by the pilot and consists of a pulley 92 on the end of the rod 91 and another pulley 93 near the pilot seat, the two being interconnected by an endless cable 94. The latter will not interfere with raising and lowering 91 through the small range needed.

The piston 72 is restrained from rotation with the rod 91 by a pin 72a shown in Figure 4 firmly fixed in the shaft 9 and extending upward through a hole in the piston 72. The piston may slide vertically on the pin. The spider 75 is restrained from turning by the bearing of its arms on the sides of the holes in shaft 9 through which the arms protrude. In assembly the rim of 75 is placed about 9 and the individual arms are screwed in place; first by screwing the arms into the hub element 75a and then by countersunk screws (not shown) through the rim into the ends of the arms.

I have indicated that the main wings are rotated by the ejection of a sheet of fluid from the slots 19 in the wing surface. The flow is produced by a blower 11 housed within the fuselage B'. See Figure 21. The discharge of the blower is into the shaft 9 by way of the curved duct 13. The blower is driven by the engine 12 through the shaft 97 and overrunning clutch 98. The bearings are 95 and 96. The shaft 97 also extends forward of the blower to a gear 99. Another overrunning clutch 100 is interposed between the gear 99 and the blower. The gear 99 is rotatable by the gear 101 on the lower end of the hub 8 through the gears 102 and 103 on the shaft 104 supported by bearings 105 and 106 on the stationary shaft 9. The purpose of the overrunning clutches is to permit the wings to turn the blower 11 without turning the engine 12; also so that the engine may turn the blower without exerting a torque on the wings. Thus no driving torque is exerted on the fuselage; only a small friction torque due to the pressure of the bearings between the hub 8 and shaft 9.

Directional torque is provided by the propeller 107 rotatable with the blower 11. Both draw air from the slot 108 extending peripherally around the body near the maximum cross section of the fuselage. The propeller sends its quota rearward through the rearward directed slots 109 and end opening 110. By moving the rudder the flow out the slots 109 is finally deflected laterally so that a directional torque is created. This torque is creatable at the will of the pilot by means of the conventional pedals 111 and cable 112 running over pulleys 113 to the rudder horn 114. Notice is called to the fact that by the arrangement shown, even when the engine fails, there is a flow out the openings 109 and 110 because the wings turn the airscrew relieved of the engine torque. Hence directional control is always present and dependent on the wings.

The flow through the fuselage openings serves the purpose of reducing the drag of the fuselage and of creating a thrust. The drag is reduced because of the boundary layer energization discussed earlier. The induction slot is located on the sides of the body so that the suction force has no great component rearward and the discharge slots are spaced rearward and formed to discharge along the body surface. By this procedure short fat bodies may be used with a saving in structural weight but with no increase in drag because the flow is induced to follow the body surface by the sheets of fluid discharged rearward.

Translation of the aircraft is possible along any axis as a function of the wings, and it is intended that this be one of the main means of progression. The condition for vertical flight is obvious and horizontal flight is achieved by tilting the axis of the main airscrew. Such a tilt will also provide a means of vertical ascent undisturbed by the use of the rearward flow out the fuselage slots to provide directional control because by an imperceptible tilt of the shaft 9 there is generated a rearward force component of the lift adequate to balance the reaction due to the flow out the fuselage slots. The same arguments will apply to hovering or vertical descent.

There are times when the wings are to be rotated at full speed with little forward velocity; or times when a forward thrust is desired without a lift on the wings as for instance on the ground. I provide for these conditions by making the pitch of the airscrew 107 adjustable, and by a valve 115 in the duct 95. I need not describe the adjustable pitch propeller because this may be obtained on the market and is not a feature in itself of my invention. I show means operable by the pilot of changing the pitch and valve setting simultaneously, although of course, the devices could be separated; or combined in other manners. A movement of the control 116 about the pivot 117 actuates the rod 118 and thereby the valve lever 119 and the pitch adjusting rod 120.

Thus the boundary layer energization on the body in a direct lift aircraft performs unique functions. It makes available a means of directional control when the engine is stopped because the wings will rotate the airscrew; and with the boundary layer energization of the wings, great safety on the ground is provided in maneuvering the air craft because the forward thrust and lift are adjustable or variable differentially. This is very important for instance in landing in a side wind or in gusty air which may overturn or carry the aircraft beyond the landing spot after contact is made with the ground.

An external propeller for forward motion is not employed because it is a source of danger on the ground and aircraft can never become truly popular with this hazard present. Even responsible people are injured by the blades invisible in rotation, and so irresponsible people, like children, cannot be permitted on the field with present-day airplanes without involving hazards to themselves and to the operators who are legally responsible for minors at least.

To locate the propeller within the fuselage would appear to be contrary to good aerodynamic theory because it is well known that the propeller efficiency depends on and is the larger, the greater the diameter. It is only through the properties of boundary layer energization that efficient propulsion is possible. With a small propeller diameter the velocity of the propeller slipstream must be large to achieve an adequate thrust. Velocity in the slipstream left behind the airplane is energy lost. Hence it is undesirable to use high slipstream velocities; but if the resistance of the aerodynamic body can be made low a large thrust will not be needed and so the difficulty would be suppressed. The sheet of fluid discharged from the slots reduces the resistance and provides a thrust simultaneously, making possible the housing of the propeller within the fuselage.

Some moments on the wing system may be classed as transverse moments because they are transverse to the plane of rotation. The terms upsetting (and righting moments) or tilting moments are applicable to any kind of a wing system and are therefore more general.

Certain proportions should be observed in the slots. For instance to accomplish a significant change in the boundary layer the slots should extend peripherally around the fuselage and they should be spaced rearward so that the energization is progressive. Otherwise the jet or sheet of fluid blown out will itself leave the body and create a low pressure wake thus defeating the purpose.

It is also very desirable that the fuselage be curved longitudinally equal amounts on all sides; for it is to be remembered that boundary layer energization is of significance on surfaces having low pressure regions forward to induce the return flow in the boundary layer. A flat surface has no suction area ahead and hence there would be no point in energizing the boundary layer on it. If the opposite side to the flat side were curved longitudinally as in some fuselages where the top is flat and boundary layer energization were used, a return flow in the boundary layer of the curved surface would be prevented but then there would be an appreciable difference in the pressure on the flat side and the curved side so that a flow would take place between these two localities. The air would travel a diagonal path rearward and downward across the fuselage, that is, a longer distance on the fuselage causing a higher resistance and turbulence would again result from the loss of energy in rubbing and from the clash of the two side flows from the top meeting on the under side.

From the preceding disclosure it will now be apparent that the aircraft may be tilted in any direction under complete control and balance as regards both lift and gyroscopic moments, as a function of the lift on the rotatable wings without regard to whether the aircraft is in horizontal or vertical flight up or down. The lift is created by the rotation of the wings by a means which provides for adequate directional control dependent on the wings and jets or sheets of fluid reduce the resistance of the aircraft for horizontal flight. Motion along horizontal axes also may be achieved by tilting the wings while vertical flight is achieved by rotation of the wings at a high rate with the boundary layer flow. Hence the organization of the aircraft may be traced through the qualities and properties of the boundary layer into motion along and about all three axes making the whole aircraft an organic whole, a cooperative unit.

While I have described the application of the various devices to a wing system rotatable about an upright axis it is to be understood that I do not limit myself to this construction only and that modifications and substitutions may be made in the specific form of the invention disclosed without departing from the spirit and scope of this invention which is defined in the appended claims.

What I claim is:

1. In an aircraft, a wing system comprising a plurality of lifting wings rotatable about an axis and subject to disturbing moments, a plurality of control blades rotatable at a greater rate than the said wings about an axis, controllable means to alter the lift of the wings, and means operably interconnecting the controllable means to alter the lift of the wings and the control blades so that the lift of a wing when in a given position is automatically governed by different control blades when in a predetermined position to oppose the said disturbing moment.

2. In an aircraft, a wing system comprising a plurality of wings rotatable about an axis and subject to upsetting moments, controllable means to alter the lift of the wings, a control element rotatable about an axis at a different speed than said wings, operable means interconnecting the control element and wings to coordinate their rotations, and automatic means employing said element to govern the controllable means to alter the lift so as to create balancing moments on the wing system.

3. In an aircraft, rotatable wings subject to disturbing moments, an element rotatable by the wings by means of an operable connection therebetween at a higher angular velocity than the wings, means to alter the lifts of the wings, and automatic means employing the said element to govern the means to alter the lifts to balance the disturbing moments.

4. In an aircraft, a plurality of wings movable relative to the aircraft about a closed path and oscillatable relative to the aircraft, a tiltable element having a plurality of axes about which a tilt can be induced and being translatable along an axis transverse to the said plurality of axes, and connecting means between the said tiltable member and no more than three of said wings at a time so that the oscillations of any wing are executable without substantially disturbing the oscillations of the other wings.

5. In an aircraft, a plurality of lifting elements rotatable about a support and articulated for oscillation relative thereto, a tiltable element operably interconnecting the lifting elements and having both rotary and translational degrees of freedom relative to the aircraft so that the lifting elements can move the tiltable element in tilt and translation, and a mechanism including a member rotatable at a different speed than said lifting element operably connected to the tiltable element so that said member partakes of a motion principally determined by the oscillation of a lifting element when in a predetermined position relative to said member.

6. In an aircraft, an element rotatable about an upright axis and oscillatable relative thereto under the influence of moments disturbing the aircraft, a wing system comprising a plurality of lifting wings rotatable about an upright axis at a different rate than the rate of said element, said lifting wings being vertically disposed with respect to the plane of rotation of said element, a member having a pluraltiy of degrees of freedom, connections between the said element and the said member providing for relative motion therebetween, means to alter the lifts of the wings, and an operable connection between said member and said means to alter the lift of the wings so that the lift alteration is automatically governed by the oscillation of said element to create balancing moments on the wing system.

7. In an aircraft sustained directly by a wing system comprising a plurality of wings movable relative to the aircraft about a closed path, means to alter unsymmetrically the lifts of the wings, and automatic means to govern the alteration of the lifts so as to create a balance of moments on the wing system, said automatic means including elements rotatable about an axis and sensitive to disturbing moments, a member tiltable about an axis and also translatable in a direction transverse to said axis and operably interconnecting at least a pair of the said elements, the position of said tiltable and translatable member determining the degrees of lift alteration of the various wings.

8. In an aircraft, a wing system comprising a plurality of wings movable relative to the aircraft about a closed path, a plurality of elements mounted on the aircraft and movable about a closed path, said elements being free to alter their path relative to the aircraft due to disturbing moments and movable at a greater path speed than the wings, means to alter the lifts of the wings unsymmetrically, and means operably interconnecting the said elements and the said means to alter the lifts so that an element can control the lift of an individual wing substantially independently of the alteration of the lift of another of said wings.

9. In an aircraft sustained by a system comprising wings rotatable about an upright axis, means to alter unsymmetrically the lifts of the wings, an element rotatable about an axis and oscillatable relative thereto, said element being rotatable at a greater rate than said wings and being disposed vertically with respect to their plane of rotation, and means to coordinate the oscillations of the element with the means of changing the lifts so that the aircraft can be automatically maintained in equilibrium.

10. In an aircraft sustained by a system comprising a plurality of wings rotatable about an upright axis and subject to disturbing moments, means to alter unsymmetrically the lift of the wings, an element rotatable about an axis at a greater speed than the wings and sensitive to disturbing moments, means rotatably connecting the wing system and said element to coordinate their rates of rotation, and means employing said element to alter automatically the lift of the wings to govern the balance of moments on the wing system.

11. In an aircraft, a plurality of wings movable relative to the aircraft about a closed path, means providing for changing the angles of attack of the wings, an element movable in and rotatable by the wings so as to create a high centrifugal force, and means employing the centrifugal force of the said element to change the angles of attack of the wings.

12. In an aircraft subject to upsetting moments, a direct lift system comprising a plurality of wings movable with respect to the aircraft about a closed path, means providing for alteration of the angles of attack of the wings, means associated with an internal fluid supply and actuated by the wings to create a fluid pressure, means employing the said internal fluid pressure to alter the angles of attack, and an element sensitive to changes in angular and forward speeds of the aircraft to automatically govern the alteration of the angles of attack so as to balance the upsetting moments.

13. In an aircraft sustained by a wing system comprising a plurality of wings rotatable about an upright axis, means providing for other rotations of the wings to alter their lifts, a lever interconnecting opposed wings to condition the lift changes, said lever having a movable fulcrum, and means to move the fulcrum.

14. In an aircraft sustained by a plurality of wings rotatable about an upright axis, at least one of said wings having an opening for the discharge of a jet rearward, a body having openings in its sides, means to secure the wings to the body, a prime mover and a means of pumping operable thereby, means of communication between the means of pumping and the opening of the wings to rotate the wings by jet action, means to discharge a fluid jet rearward through the body openings to serve the dual purpose of reducing the resistance and creating a thrust, and means to regulate the quantity of fluid differentially between the wing jet and the body jet.

15. In an aircraft, a wing system comprising rotatable lifting wings subject to disturbing moments, a control blade mounted for rotation about an axis and oscillatable relative thereto, said blade taking up positions of equilibrium established by the balance of centrifugal force and the wind force on the blade, means to change the lift of the wings in a direction to oppose the upsetting moments, automatic means including said control blade to govern the lift alteration of the wings, said position of equilibrium ensuring that the extent of the change in lift is substantially equal to the change required for establishing balance on the wing system, and means to change the pitch of the blade and wings in coordinated relationship.

16. In an aircraft, a wing system comprising rotatable lifting wings subject to disturbing moments, a control blade mounted for rotation about an axis and oscillatable relative thereto, said blade taking up positions of equilibrium established by the balance of centrifugal force and the wind force on the blade, means to change the lift of the wings in a direction to oppose the upsetting moments, automatic means including said control blade to govern the lift alteration of the wings, said position of equilibrium ensuring that the extent of the change in lift is substantially equal to the change required for establishing balance on the wing system, and means to change the pitch of the blade and wings differentially.

17. In an aircraft, a wing system comprising rotatable lifting wings subject to disturbing moments, automatic means to alter the relationship between the lifts of the wings to oppose the disturbing moments, a horizontally rotatable airscrew of smaller diameter than the wing system's diameter, an operable interconnection between the wing system and said airscrew so that the wing system in its autorotative state of operation can drive the airscrew at a greater rate of rotation, and means to alter the pitches of the wings and the airscrew to provide an autorotative state for the wings and a driven state for the airscrew.

18. In an aircraft subject to upsetting moments, a direct lift system comprising a plurality of wings movable with respect to the aircraft about a closed path, means providing for alteration of the angles of attack of the wings, means associated with an internal fluid supply and actuated by the wings to create a fluid pressure, and automatic means employing the said internal fluid pressure to alter the angles of attack to create balancing moments on the aircraft, said automatic means being responsive to the upsetting moments.

19. In an aircraft, rotatable lifting wings to create a direct lift, controllable means for each wing to alter the angles of attack of the wings, a rotatable control blade having operable means of changing the wind force on said blade, automatic means including said control blade and said controllable means to alter the lifts of the wings substantially independently of each other to create balancing moments on the aircraft, and means to operate said operable means to change the wind force on said control blade.

20. In an aircraft adapted for horizontal flight, means to create a direct lift comprising a plurality of wings rotatable about an axis, controllable means for controlling the lift of each retreating wing independently of the control of an advancing wing, and a control element having a different angular rate of rotation than said wings and operably connected to said controllable means for automatically governing said controllable means to create balancing moments on the means to create a direct lift.

21. In an aircraft, a wing system comprising a plurality of wings rotatable about an axis and subject to upsetting moments, controllable means to alter the lift of the wings, at least two control elements mounted to have a different rate of rotation than said wings and oscillatable relative to each other, and automatic means employing said elements to govern the controllable means to alter the lift to create balancing moments on the wing system.

22. In an aircraft, a wing system comprising a plurality of wings rotatable about an axis and subject to upsetting moments, controllable means to alter the lift of the wings, a control blade having a different rate of rotation than said wings and oscillatable relative to them, automatic means employing said blade to govern the controllable means to alter the lift and oppose the upsetting moments on the wing system, and manual means to alter the lifting capacity of said control blade.

23. In an aircraft, a body, a direct lift system comprising a plurality of wings rotatable about an upright axis, controllable means supporting said system on the body for controlled universal inclination of the said axis of rotation relative to said body, power means operably connected between said body and the wing system to derive power from it because of its speed relative to the said body, and controllable means operably connected to said first named controllable means to apply the derived power to it to tilt the wing system so that its said axis of rotation is inclined relative to said body to provide steering control for guiding the aircraft.

24. In an aircraft, a lifting system to sustain the aircraft, an aircraft structure, said wing system comprising a plurality of wings movable relative to the said structure about a closed path, means providing for altering the angles of attack of the wings, and controllable power means operably connected to said first named m.ans to apply power thereto to alter the angles of attack, said power means operably interconnecting a said wing and said structure to derive its power by virtue of the relative motion between the said wing and said structure.

EDWARD A. STALKER.